United States Patent
Gottlieb

(10) Patent No.: US 7,736,219 B2
(45) Date of Patent: Jun. 15, 2010

(54) METHOD OF PLAYING AN INTERACTIVE FANTASY BOXING LEAGUE GAME

(76) Inventor: David E. Gottlieb, 510 E. 23-rd St., Apt. 5E, New York, NY (US) 10010

( * ) Notice: Subject to any disclaimer, the term of this patent is extended or adjusted under 35 U.S.C. 154(b) by 521 days.

(21) Appl. No.: 11/680,103

(22) Filed: Feb. 28, 2007

(65) Prior Publication Data

US 2007/0207845 A1    Sep. 6, 2007

Related U.S. Application Data

(60) Provisional application No. 60/778,438, filed on Mar. 2, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/4; 463/40
(58) Field of Classification Search ............ 463/4, 463/40
See application file for complete search history.

(56) References Cited

U.S. PATENT DOCUMENTS 4,918,603 A    4/1990    Hughes et al.
6,371,855 B1    2/2002    Gavriloff
2004/0110552 A1*    6/2004    Del Prado ............... 463/4
2005/0137728 A1    6/2005    Guagliardo
2006/0217198 A1*    9/2006    Johnson ............... 463/40

OTHER PUBLICATIONS

"Fantasy Boxing League", Oct. 14, 1999, <http://web.archive.org/web/19991014020551/http://www.fortunecity.com/olympia/wagner/37/league.htm>.*

* cited by examiner

*Primary Examiner*—Dmitry Suhol
*Assistant Examiner*—Jason Pinheiro
(74) *Attorney, Agent, or Firm*—Michael J. Striker

(57) ABSTRACT

In the method of playing a professional boxing fantasy league game players select names of real professional boxers from a database to staff their fantasy gyms and manage the fantasy gyms during a season in which real boxing matches take place between the selected boxers to determine which of the players is better at selecting and managing the boxers for his or her fantasy gym. The fantasy boxing competition is scored by assigning boxer point values according to a predetermined, unique and specific set of criteria according to the actual results of real boxing matches that take place between the selected boxers during the game. A cumulative total of gym points for each gym based on the boxer point values acquired by the boxers of the gym when they are active and on the gym roster determines the competition winner.

12 Claims, 3 Drawing Sheets

SCORING TABLE*

Opponent Divisional Ranking

|  |  | >10 | 6 - 10 | 3 - 5 | 1 - 2 | Champ |
|---|---|---|---|---|---|---|
| Win by | KO | 100 | 200 | 300 | 400 | 500 |
| Win by | UD | 90 | 180 | 270 | 360 | 450 |
| Win by | MD | 80 | 160 | 240 | 320 | 400 |
| Win by | SD | 75 | 150 | 225 | 300 | 375 |
| Draw |  | 50 | 100 | 150 | 200 | 250 |
| Lose by | SD | 25 | 50 | 75 | 100 | 125 |
| Lose by | MD | 15 | 30 | 45 | 60 | 75 |
| Lose by | UD | 10 | 20 | 30 | 40 | 50 |
| Lose by | KO | -100 | -50 | -25 | -10 | -5 |

X-Axis represents divisional rank of opponent
* Potential Championship and Performance Bonuses not included

FIG. 3

METHOD OF PLAYING AN INTERACTIVE FANTASY BOXING LEAGUE GAME

CROSS-REFERENCE

This application claims the benefit of U.S. Provisional Patent Application Ser. No. 60/778,438, filed Mar. 2, 2006, under 35 U.S.C. 119 (e). The subject matter of the aforesaid U.S. Provisional Patent Application is further explicitly incorporated herein by reference thereto.

BACKGROUND OF THE INVENTION

1. The Field of the Invention

The present invention relates to an interactive fantasy sports league game and, more particularly, to an interactive fantasy boxing league game in which the ability of players to set up and manage fantasy gyms made up of real professional boxers is graded according to the real performance of the professional boxers selected to be on the roster of their fantasy gyms during the season of boxing matches.

2. Description of the Related Art

Interactive fantasy sports leagues are widely known and have been developed for various sports including "fantasy baseball", "fantasy football", and "fantasy basketball" to name only a few. In many games of this type, participants will select or "draft" professional athletes to form each of the fantasy teams in a particular league. Throughout the duration of the league, the participants may also make trades with other fantasy teams, add players to their fantasy team that are not on any team's roster, drop players not performing adequately, and make other such decisions similar to the decisions real-life owners and general managers need to make regarding actual professional sports teams. A predetermined statistical criterion determines the points a fantasy team will be awarded for certain actual statistical achievements of its athletes in real games. In short, success and failure in a fantasy league is based on the actual statistical performance of the players selected to be on each fantasy team in real athletic contests.

Patents have been awarded for methods of running fantasy sports contests.

In U.S. Pat. No. 4,918,603, issued to Hughes, et al, a method of playing fantasy football in which the scoring is based on the performance of actual football players is described. However, the method is completely limited to football, since it relies on the specific statistics unique to football, such as passing yardage, rushing yardage, number of touchdowns, and extra points. As a result, the method of Hughes, et al, cannot be used to play other types of fantasy sport games.

U.S. Pat. No. 6,371,855 issued to I. Gavriloff describes an interactive sports game in which a collection of users of a network participate in a remote fantasy sports league, where positive and negative scores are assigned based on the actual performance of real players assigned to individual fantasy teams in actual games. A specific method of scoring a fantasy boxing league contest is not an obvious application of the method and system described in the patent issued to Gavriloff. U.S. Pat. No. 6,371,855 only sets forth a general method for providing an interactive fantasy sports contest to a number of participants, but does not set forth any method for scoring a fantasy-boxing contest. In U.S. Published Patent Application 2005/0137728 of A. V. Guagliardo in which a fantasy wrestling game method is disclosed, the examiner determined that while merely extending the Gavriloff fantasy sports game concept to the sport of wrestling constituted an obvious application of the method of Gavriloff, the Guagliardo claims, which set forth scoring methods based on subject matter unique to wrestling and not disclosed in any prior art, were allowable.

None of the patents described above or otherwise have combined the concept of fantasy sports and the unique statistics, achievements, and events of professional boxing. Thus the need exists for a method, which incorporates the unique statistics, achievements, and events into a fantasy boxing game.

SUMMARY OF THE INVENTION

It is an object of the present invention to provide a method for a number of participants to play a fantasy boxing league game, which tests the participants' abilities to set up a fantasy gym made up of real professional boxers and to manage them throughout the fantasy boxing season.

In the method according to the invention for playing a fantasy boxing league game the scoring of the participants' selection and management of their fantasy gyms is based on actual boxing performance statistics of real boxers whose names are selected from a central database by the respective participants. Real boxing statistics for the boxers in each fantasy gym are used to award points to the boxers based on the relative magnitude of their real-life boxing accomplishments during the game or contest between the participants. Each participant will attempt to maximize his or her gym's point total, the winner being the owner with the highest point total.

The invention allows participants to test their skills in running a boxing gym and their abilities in grading boxing talent.

According to a preferred embodiment of the invention the play of the participants during the game is scored by assigning boxer point values to professional boxers in the database according to actual results of real professional boxing matches held during the game. The boxer point values assigned to the professional boxers during the contest comprise base point values determined by the manner in which each of the professional boxers won or lost each of the boxing matches taking place during the contest, whether via knockout, technical knockout, disqualification, retiring between rounds, unanimous decision, majority decision, split decision, draw, or no-contest decision.

In a further development of the preferred embodiment the boxer point values are equal to the above-described base point values plus supplemental point values assigned to the professional boxers based on a specific weight class divisional ranking and/or a pound-for-pound ranking of opponents of the professional boxer during the boxing matches fought between the boxers and the opponents. The supplemental point values assigned to the boxers can also be based on specific fight events including claiming a championship of a specific weight class, claiming a vacant champ status in a specific weight class, defending a championship in a specific weight class, winning championship belts from a predetermined list of sanctioning boxing organizations, winning vacant championship belts from a predetermined list of sanctioning boxing organizations, unifying belts from multiple sanctioning boxing organizations, knockdowns, beating undefeated opponents, early round knockouts, and winning unanimous decisions by more than four points on all judges' scorecards.

According to a preferred embodiment during the contest or game the participating owners of the fantasy gyms compete against each other by first selecting the names of the actual professional boxers to be assigned to their respective gyms from the database at the beginning of the game and then managing the boxers in their gym by actions including, but not limited to, adding boxers to their gym from a pool of unselected boxers remaining in the database and/or dropping boxers from their gym or trading boxers with other gyms while maintaining the total number of boxers in their gym constant, and choosing to activate or deactivate boxers during the game play.

According to a preferred embodiment of the invention the participants select the boxers for their fantasy gyms by conducting a draft or auction in which they take turns selecting a predetermined number of names of professional boxers from the database. The predetermined number of names must be the same in each fantasy gym for fair game play. Preferably the draft is conducted in a series of rounds in which each participant selects one boxer for his or her gym and the order of the participants is determined randomly.

In further embodiments of the method of the invention the boxer point values assigned to the professional boxers are stored in the database so that names of the professional boxers are associated with the boxer point values assigned thereto and the boxer point values in the database are updated with actual results as the boxing matches take place during the contest. Gym point values are assigned to each fantasy gym based on the boxer point values acquired by the boxers while the boxers are on the roster of the gym. The contest winner is determined according to the total gym points received by the fantasy gyms at the end of the contest or game.

In an especially preferred embodiment the database is stored in a server computer controlled by a commissioner who resolves disputes and the participants use terminal devices connected with the server computer via a network, such as the Internet, to select and manage boxers for their fantasy gyms. The boxer point values are assigned to boxers and the gym point values are assigned to fantasy gyms under control and review by authority of the commissioner.

BRIEF DESCRIPTION OF THE DRAWING

The objects, features and advantages of the invention will now be illustrated in more detail with the aid of the following description of the preferred embodiments, with reference to the accompanying figures in which:

FIG. 3 is a scoring spreadsheet showing boxer point values assigned to a boxer in a gym on the basis of the actual results of a real boxing match held during the game or contest.

DESCRIPTION OF THE PREFERRED EMBODIMENTS

At the start of each fantasy boxing league game or contest, each participant owner of a fantasy boxing gym will compile a roster consisting of the names of professional boxers selected from a predetermined database, strategically choosing boxers based on each boxer's skill, upcoming schedule, and other factors in an attempt to maximize their own gym's potential for accumulating fantasy points.

A draft or auction is conducted prior to the start of game play in which each of the participants selects the names of the professional boxers for his or her gym from the database. The draft may consist of a series of successive rounds, in each of which the participants take turns selecting a name of one of the boxers in the database. The order in which the participants select boxers can be determined according to chance or randomly by any of a variety of well-known ways. The random selection of the order of participants can be determined immediately prior to the beginning of the draft. The number of successive rounds would thus be equal to the number of boxers that are permitted in each fantasy gym, for example 10 to 20 boxers. Of course the number of boxers in each fantasy gym would be the same for each gym in order to ensure fair play.

In an especially preferred embodiment a central controller or Commissioner selects the names of the professional boxers entered in the database prior to the start of game play. Optionally participants may petition the Commissioner or controller for entry of an eligible boxer who is not entered in the database.

During the contest or game, the boxers are assigned fantasy boxer points based on a predetermined, specific and unique set of statistics which are dependent on the actual results of real boxing bouts involving the boxers in the database conducted during the game or contest. However in order for the bout to be eligible so that the actual results of that bout can be used to award boxer points to the boxers, preferably the fight must be scheduled for at least 8 or 10 rounds and a reputable boxing authority must sanction the fight.

Figure 1:
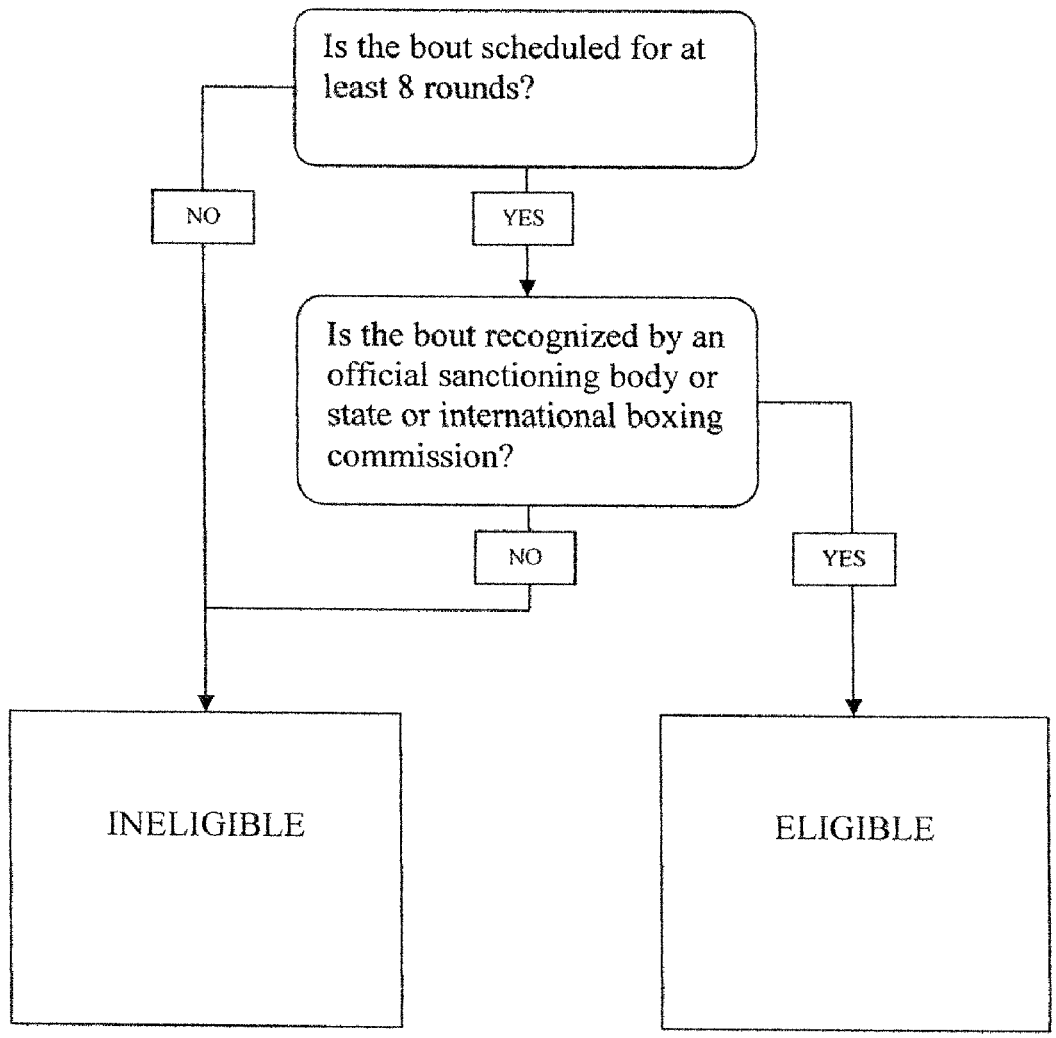
FIG. 1 is a flow chart showing the method by which professional boxing bouts are qualified for assignment of fantasy points to the boxers in the fantasy-boxing league.

A flow chart showing the procedure for determining whether a boxing match fought between a boxer in the database and another boxer is eligible for awarding boxer points to the boxer is shown in FIG. 1.

If the boxing match is eligible for awarding points to a boxer in the database, boxer points are assigned to each boxer in the database following the conclusion of the bout.

Figure 2:
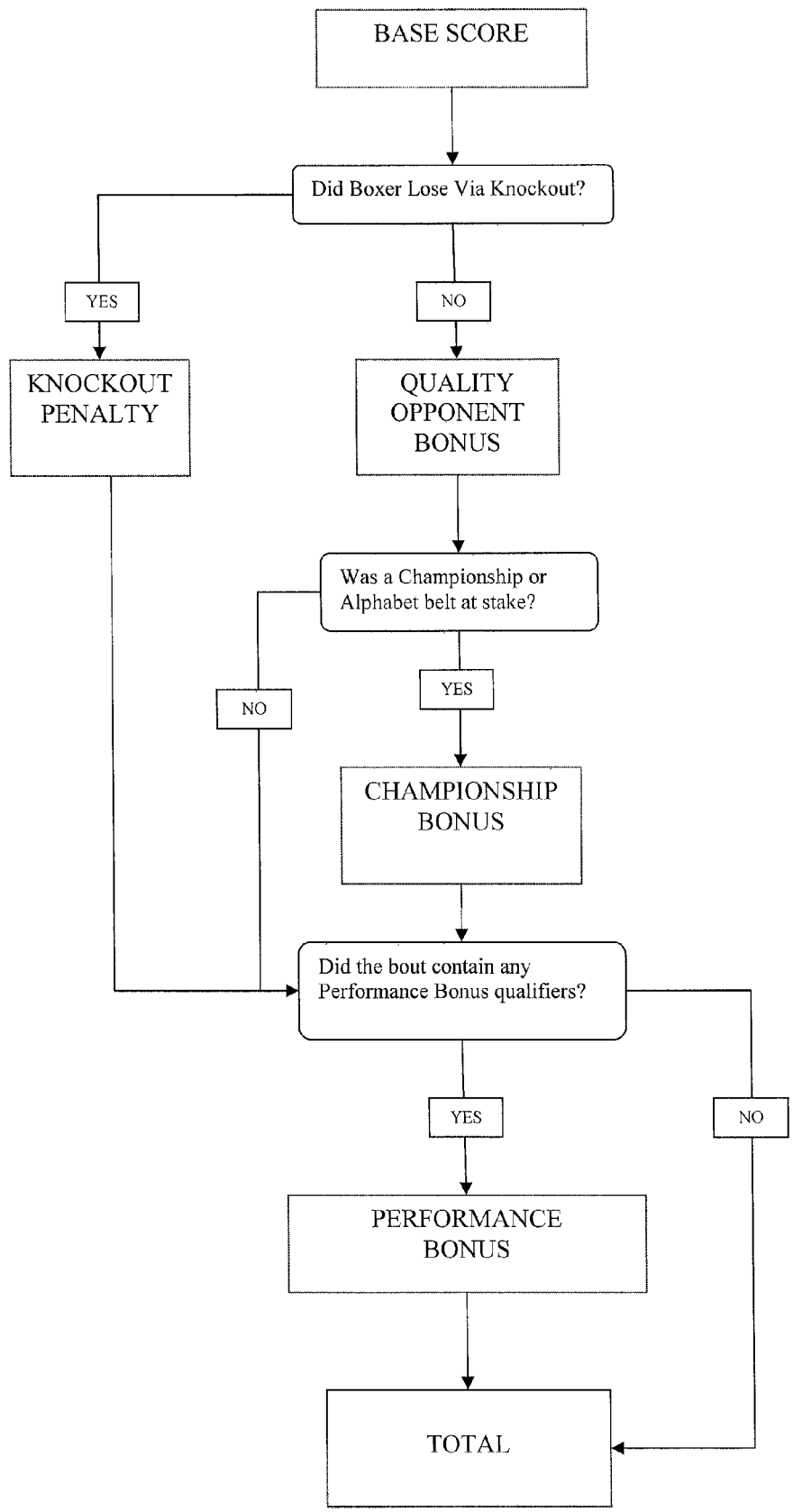
FIG. 2 is a flow chart which illustrates the method of calculating the fantasy point value attributed to a particular boxer of a gym following the result of a boxing match.

The procedure for determining the boxer point value assignable to each boxer on the basis of the results of an eligible boxing event is illustrated in FIG. 2 and described herein below. The boxer point value awarded to a boxer after each match is the sum total of a base point value that depends on the exact manner in which the bout ends for the boxer plus supplemental point values and bonuses for the boxer that are described herein below in more detail. The following points 1 to 5 are added to obtain the boxer point value at the end of the match.

1. Base Score: A boxer is assigned a positive or negative point value as a result of the specific manner in which a bout ends for the boxer. Specifically, different positive or negative point values are awarded if the boxer wins or loses via a knockout, a technical knockout, a disqualification, retiring between rounds, unanimous decision, a majority decision, a split decision, or if the bout resulted in a draw or no-contest. The actual base point values awarded in one embodiment of the game are shown in the following Table I.

2. Quality Opponent Bonus: A boxer is assigned a positive point value as a result of the ranking of his opponent in an eligible boxing match regardless of the result (unless a boxer loses via a knockout) both in a particular weight class and the pound-for-pound rankings. The actual quality opponent bonus point values are shown in the following Table I.

3. Knockout Penalty: A boxer is assigned a negative point value as a result of losing via a knockout. The better the ranking of the opponent, the smaller the penalty will be. The actual knockout penalty values are shown in the following Table I.

4. Championship Bonuses: A boxer is assigned a positive point value for defending or claiming a championship or sanctioning organization belt in any weight class. The actual championship bonus points are shown in the following Table I.

5. Performance Bonuses: A boxer is assigned a positive point value for a set of achievements occurring during or as a result of a boxing match including knockdowns, early round knockouts, beating undefeated opponents, and winning unanimous decision by more than four points on each judge's scorecard. The performance bonus point values are shown in the following Table I.

TABLE I

SCORING SCHEME FOR AWARDING BOXER FANTASY POINTS AFTER AN ELIGIBLE BOXING MATCH

| 1. BASE SCORE (x)* | |
| --- | --- |
| Win by KO, TKO, RT, DQ | 100 |
| Win by UD | 90 |
| Win by MD | 80 |
| Win by SD | 75 |
| Draw | 50 |
| Loss by SD | 25 |
| Loss by MD | 20 |
| Loss by UD | 10 |
| Loss by KO, TKO, RT, DQ, NC | 0 |
| 2. QUALITY OPPONENT BONUS | |
| Divisional Ranking | |
| Champ | +4x |
| 1-2 (Champ if title is not at stake) | +3x |
| 3-5 | +2x |
| 6-10 | +1x |
| Pound-for-Pound Ranking | |
| 1-2 | 60 |
| 3-5 | 40 |
| 6-10 | 20 |
| 3. KNOCKOUT PENALTY | |
| Divisional Ranking | |
| Champ | −5 |
| 1-2 | −10 |
| 3-5 | −25 |
| 6-10 | −50 |
| 10+ | −100 |
| 4. CHAMPIONSHIP BONUSES | |
| World Championship Bonuses | |
| Claiming Championship from Champ | 50 |
| Claiming Vacant Champ Status | 30 |
| Championship Defense | 20 |
| Alphabet Belts | |
| Winning a WBC, WBA, IBF, WBO title belt | 25 |
| Claiming Vacant Title Belt | 15 |
| Defending an Alphabet Belt | 10 |
| Title Belt Unification | 10 |
| 5. PERFORMANCE BONUSES | |
| Knockdowns (other than KO) | |
| Champ | 15 |
| Ranked Contender | 10 |
| Other | 5 |
| Beating an Undefeated Opponent | 5 |
| Early Round KO (Rounds 1-3) | 5 |
| UD >4 points on each card | 5 |

*Abbreviations: KO = knockout; TKO = technical knockout; RT = retire between rounds; DQ = disqualification; UD = unanimous decisions; MD = majority decision; SD = split decision; NC = No Contest. (any decision based on points or judge scorecards, whether 12-round decision or technical decision will be governed by UD, MD, and SD scores)

A scoring spreadsheet is shown in FIG. 3, which shows the possible boxer point values that would be awarded to a boxer after an eligible fight in cases in which there are no performance bonuses or championship bonuses. The boxer point values awarded to the boxer depend on the ranking of the boxer's opponent. The columns of the spreadsheet are labeled with the opponents rank. The rows are labeled with the possible results of the bout. The values in the spreadsheet are the sum of the base points for the outcome, the quality opponent bonus, and the knockout mitigator.

In order to demonstrate the procedure for awarding boxer points after a match has been fought between the boxer and another boxer, several examples are provided herein below.

In example 1 fantasy gym A has Boxer Z on its roster and fantasy gym B has Boxer Y on its roster. Boxer Z is champ of the welterweight division, has the WBC belt, is ranked #1 pound-for-pound, and is undefeated prior to the bout. Boxer Y is the #6 ranked contender in the light middleweight division, has the WBA belt, and is ranked #10 pound-for-pound. The bout is taking place in the light middleweight division. Boxer Y wins via unanimous decision. During the course of the bout Boxer Z knocks Boxer Y down twice. The method of fantasy boxing described in this invention would assign the following boxer point values to the respective boxers of example 1.

Boxer Y would be assigned 90 points base score for winning by unanimous decision. Boxer Y would be assigned 90×3 points (270 points) opposing the champ of another division, since the title is not at stake. Boxer Y would be assigned 60 points for beating the #1 ranked boxer pound-for-pound. Boxer Y would not be assigned any championship bonuses, since the title and alphabet belts are not at stake. Boxer Y would be assigned 5 points performance bonus for defeating an undefeated opponent. In sum, Boxer Y would be assigned 90+270+60+5, a total of 425 points.

Boxer Z would be assigned 10 points base score for losing by unanimous decision. Boxer Z would be assigned 10×1 points (10) for opposing the #6 ranked boxer in the division. Boxer Z would be assigned 10×2 points (20) performance bonus for knocking down twice. In sum, Boxer Z would be assigned 10+10+20 points, a total of 40 points.

In example 2 fantasy gym C has Boxer X on its roster and fantasy gym D has Boxer W on its roster. Boxer X is the champ of the super featherweight division. He has no sanctioning organization belts, and is ranked #2 pound-for-pound. Boxer W is the #2 ranked contender in the featherweight division, has the WBO belt, and is not ranked pound-for-pound. The bout will take place in the super featherweight division. Boxer X wins via second round technical knockout, knocking Boxer W twice before the stoppage. The method of fantasy boxing described in this invention would assign the following boxer point values to the respective boxers of example 2.

Boxer X would be assigned 100 points base score for winning by a technical knockout. Boxer X would be assigned 100×3 (300) points for opposing the #1 ranked contender of a different division. Boxer X would be assigned 20 points for defending a championship and 10 points for defending a sanctioning organization belt, according to the championship bonus. Boxer X would be awarded 10×2 (20) points for knocking down Boxer W twice. Boxer X would be awarded a performance bonus of 5 points for an early round KO win. In sum, Boxer X would be assigned 100+300+20+10+20+5, a total of 455 points.

Boxer W would be assigned 0 points base score for losing by a knockout. Boxer W would be penalized 5 points for getting knocked out by the divisional champ.

In sum, Boxer W would be assigned −5 points.

In another preferred embodiment of the invention the number of boxing matches that a gym may compete in or use to produce boxer points for boxers on their roster is a certain limited fixed number, for example from 20 to 30, in order to put all the fantasy gyms on a "level" playing field.

In a further illustration of the fantasy boxing league game according to the invention 10 to 12 participants would form a league with each gym having a roster of e.g. 10 to 20 boxers who are selected from the central database of eligible boxers. The duration of a fantasy boxing league contest or game would presumably be determined by the preference of each participant or owner. However the contest or play would preferably last for 6 to 9 month in order to ensure sufficient time for all boxers on the roster of each fantasy gym to engage in at least one real boxing match.

Throughout the course of the fantasy boxing league contest the boxers in each gym would be awarded points according to the aforementioned scoring scheme after each boxing match during the season. As the season progresses the fantasy gyms would have the opportunity to add unclaimed boxers from the database to their gym's roster, return boxers from their gym to the database of boxers so that other gyms will have the chance to claim the boxer, and to make trades with other gyms, in order to change their roster of boxers and maximize their potential for scoring the most points and thereby winning the game or contest.

In an especially preferred embodiment of the fantasy boxing league game the participants would be equipped with terminal devices connected to a central server under control of a commissioner, who resolves disputes between the participants, via a network such as the Internet. The database of eligible boxers would reside in a memory associated with the central server along with boxer point data produced by matches during the game. The central server could acquire actual results of the relevant boxing matches over the Internet by exchanging data with other computer devices connected with the network. The terminal device also could have or be associated with a resident memory device for storing the names of the boxers selected for his or her fantasy gym during the draft by the participant operating the terminal device.

While the invention has been illustrated and described as embodied in a method for playing an interactive fantasy boxing league game, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of playing a professional boxing fantasy league game comprising a contest between a plurality of remotely located participants communicating with each other via a computer network, said computer network comprising a plurality of computer terminals operated by said participants and a central server computer controlled by a commissioner who resolves disputes among the participants, said method comprising the steps of:
   a) compiling a database made up of names of real professional boxers;
   b) storing said database comprising said names of said real professional boxers in said central server computer;
   c) conducting a draft or auction at a beginning of the contest in which said participants take turns selecting a predetermined number of the names of said boxers from said database in said central server computer using said computer terminals to form respective fantasy gyms owned by said participants, wherein said predetermined number of said names is the same in each of said fantasy gyms;
   d) managing said fantasy gyms by said participants, wherein said managing includes adding the names of other boxers to said fantasy gyms from a pool of said boxers remaining in said database after conducting said draft or said auction of step c) and dropping the names of current boxers from said fantasy gyms so that said predetermined number of said names in each of said fantasy gyms remains the same at all times during the contest, activating or deactivating selected ones of said boxers in said fantasy gyms during the contest and trading the boxers between said fantasy gyms during the contest by communicating with said central server computer over said network;
   e) assigning boxer point values to the professional boxers in accordance with actual results of real professional boxing matches between the professional boxers that take place during the contest that are acquired by said central server computer under control and review by the commissioner;
   f) storing the boxer point values assigned to the professional boxers in said database in said central server computer so that the names of the professional boxers are associated with the boxer point values assigned thereto and the boxer point values are updated with said actual results as the boxing matches take place during the contest;
   g) assigning gym point values to each of said fantasy gyms during said contest, wherein said gym point values are equal to the boxer point values that said boxers in each of said fantasy gyms receive in a limited predetermined number of said boxing matches but only when said boxers are in each of said fantasy gyms and are active; and
   h) determining a gym point total for each of said fantasy gyms from said gym point values with said central server computer in order to determine a contest winner from among said participants at an end of said contest;
   wherein said boxers are assigned said boxer point values as a result of said actual results of said boxing matches in which said boxers participates during the contest and wherein said boxer point values are each equal to a sum of a base score determined by an actual outcome of one of the boxing matches and bonus point values for said one of said boxing matches;
   wherein said bonus point values for said one of said boxing matches are a sum of a divisional ranking bonus that depends on a divisional ranking of an opponent, a pound-for-pound bonus that depends on a pound-for-pound ranking of said opponent, a penalty that results from a knockout by said opponent, said penalty being a negative point value whose magnitude depends on a divisional ranking of said opponent, a championship bonus, and a performance bonus; and
   wherein said divisional ranking bonus is equal to 4 times said base score if said opponent is a champ, 3 times said base score if said opponent has a divisional ranking of 1 or 2, 2 times said base score if said opponent has a divisional ranking of 3 to 5, and is equal to said base score if said opponent has a divisional ranking of 6 to 10.

2. The method as defined in claim 1, wherein the boxer point values assigned to the professional boxers during the contest comprise base point values determined by whether each of the professional boxers won or lost each of the boxing matches taking place during the contest via knockout, technical knockout, disqualification, retiring between round, point, technical decision, unanimous decision, majority decision, or split decision, or each of the boxing matches taking place during the contest resulted in a draw or no-contest decision.

3. The method as defined in claim 2, wherein the boxer point values assigned to the professional boxers comprise said base point values plus supplemental point values assigned to the professional boxers based on a specific weight class divisional ranking and a pound-for-pound ranking of opponents of the professional boxers during said boxing matches fought between the boxers and the opponents during the contest.

4. The method as defined in claim 3, wherein the supplemental point values assigned to the professional boxers are additionally based on specific events occurring as a result of winning the boxing matches taking place during the contest and wherein said specific events include claiming a championship of a specific weight class, claiming a vacant champ status in a specific weight class, defending a championship in a specific weight class, winning championship belts from a predetermined list of sanctioning boxing organizations, winning vacant championship belts from a predetermined list of sanctioning boxing organizations, unifying belts from multiple sanctioning boxing organizations, knockdowns, beating undefeated opponents, early round knockouts, and winning unanimous decisions by more than four points on all judges scorecards.

5. The method as defined in claim 1, wherein said boxers are selected for said fantasy gyms by conducting said draft and wherein said draft is conducted in a series of successive rounds in each of which each of said participants selects a respective one of said boxers from said database for one of said fantasy gyms and an order in which said participants select said boxers in each of said successive rounds is randomly determined.

6. The method as defined in claim 1, wherein said boxers are assigned said boxer point values only from those of said actual results from boxing bouts between said boxers that are scheduled for at least 8 to 10 rounds and that are sanctioned by a reputable boxing authority.

7. The method as defined in claim 1, wherein said boxer point values are assigned to said boxers and said gym point values are stored in the database in the server computer and/or in a memory device associated with the computer terminals.

8. The method as defined in claim 1, wherein said pound-for-pound bonus is equal to 60 if said opponent has a pound-for-pound ranking of 1 to 2, 40 if said opponent has a pound-for-pound ranking of 3 to 5 and 20 if said opponent has a pound-for-pound ranking of 6 to 10.

9. The method as defined in claim 1, wherein said penalty value is −5 if said opponent is said champ, −10 if said opponent has said divisional ranking of 1 to 2, −25 if said opponent has said divisional ranking of 3 to 5, and −50 if said opponent has a divisional ranking of 6 to 10, and −100 if said opponent has a divisional ranking greater than 10.

10. The method as defined in claim 1, wherein said championship bonus is determined by and differs according to wining a championship from said champ, claiming a vacant champ status, defending a championship, wining a title belt, claiming a vacant title belt, defending an alphabet belt and unifying a title belt.

11. The method as defined in claim 1, wherein said performance bonus is determined by and differs according to a knockdown of said champ, a ranked contender or said opponent, beating an undefeated opponent, knocking said opponent out during rounds 1 to 3, and a unanimous decision with four points on each judge's card.

12. The method as defined in claim 1, wherein said boxer point values assigned during said contest are a sum of base point values, bonus point values, and knockout penalty point values;
   wherein said base point values differ by and are determined by at least one actual outcome of said real professional boxing matches between the professional boxers taking place during said contest, each of said actual outcomes consisting of a draw, a win or a loss by knockout, a win or a loss by technical knockout, a win or a loss because of a retirement between rounds, a win or a loss by unanimous decision, a win or a loss by majority decision, or a win or a loss by split decision;
   wherein said bonus point values differ by and are determined by a specific weight class divisional ranking of opponents of said boxers, pound-for-pound ranking of opponents of said boxers, winning championship belts, unifying title belts, knockdowns, beating undefeated opponents, knockouts during rounds 1 to 3, and unanimous decisions with greater than four points on each judge's card.

* * * * *